Aug. 29, 1939.  L. A. ZINKE  2,171,205
POWDER DISTRIBUTING ATTACHMENT FOR TRACTORS
Filed Aug. 26, 1937  3 Sheets-Sheet 2
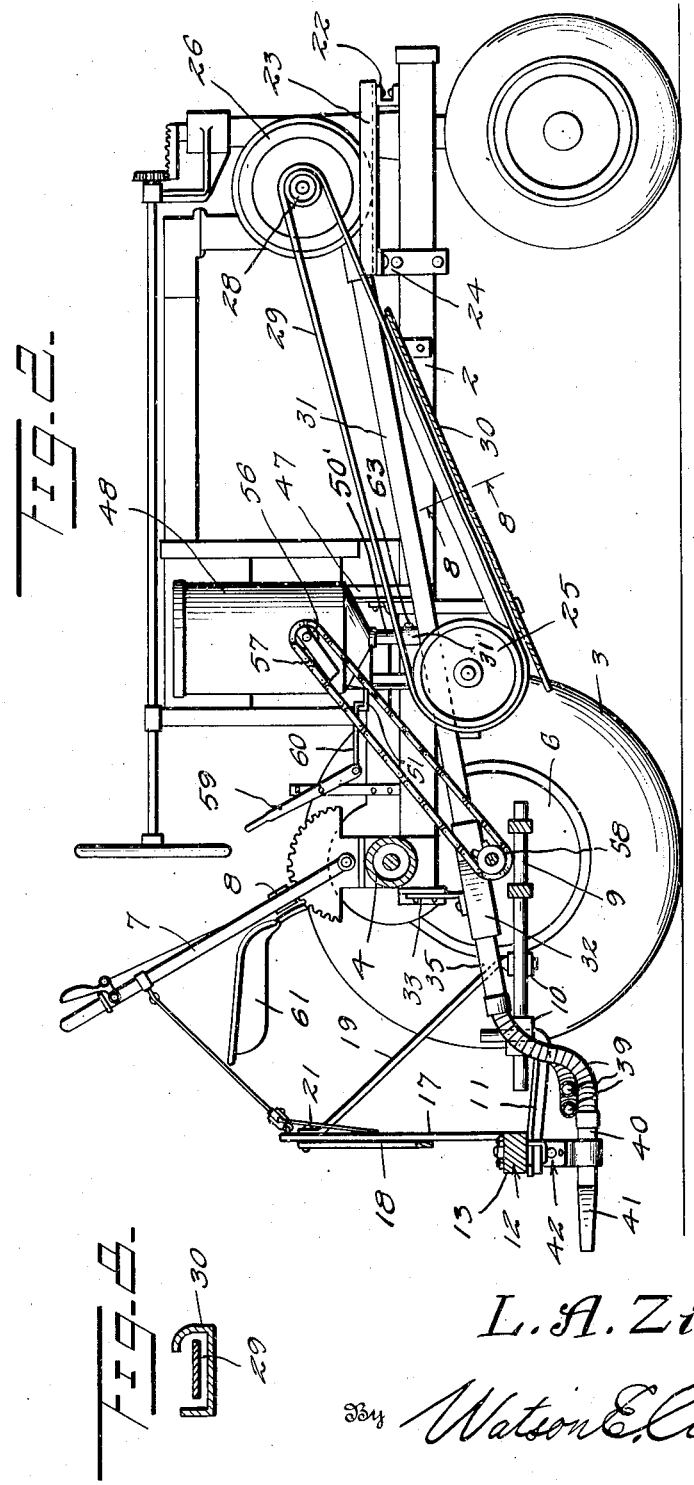
Inventor
L. A. Zinke
By Watson E. Coleman
Attorney Aug. 29, 1939.  L. A. ZINKE  2,171,205
POWDER DISTRIBUTING ATTACHMENT FOR TRACTORS
Filed Aug. 26, 1937  3 Sheets-Sheet 3
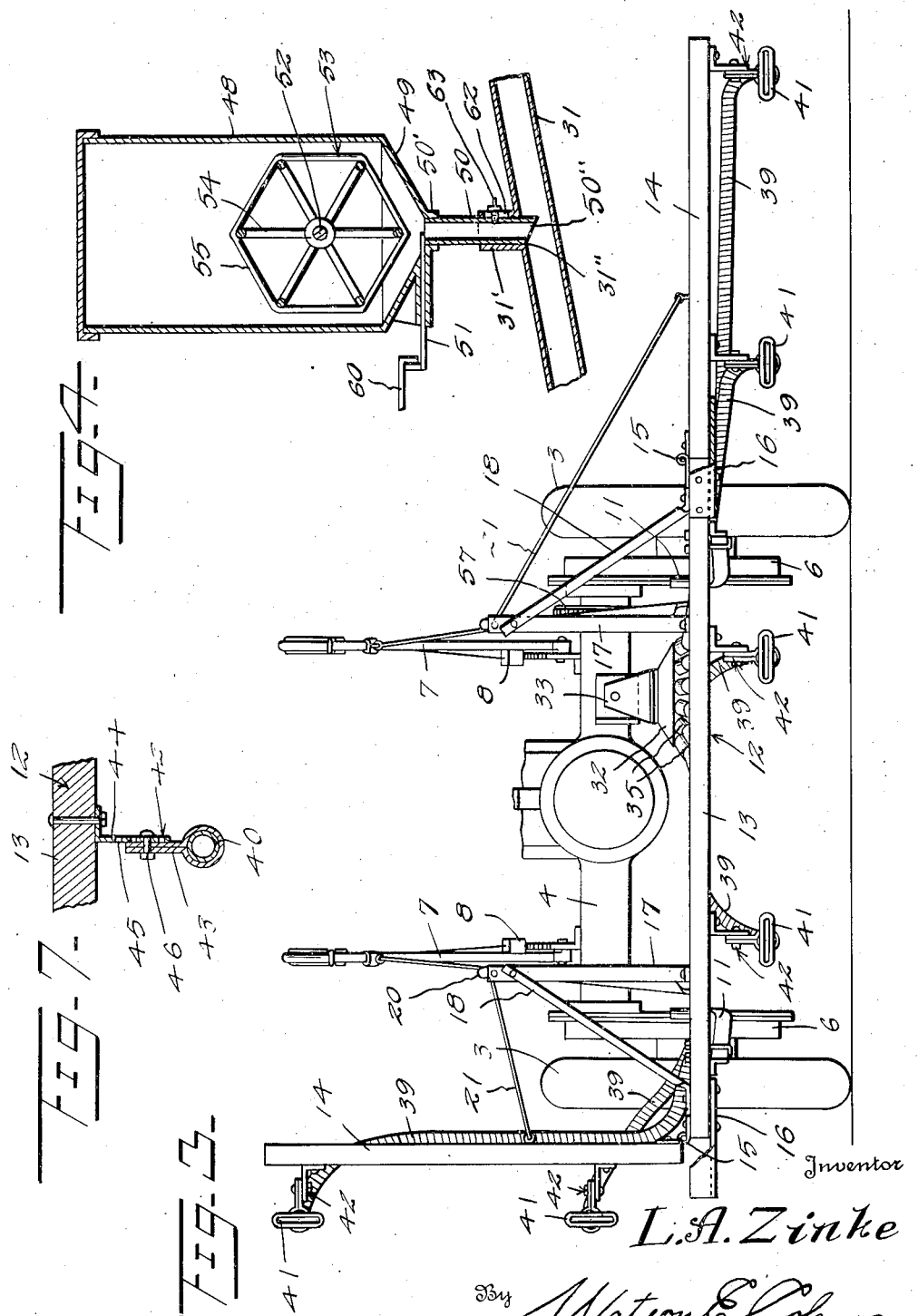
Inventor
L. A. Zinke
By Watson E. Coleman
Attorney Patented Aug. 29, 1939

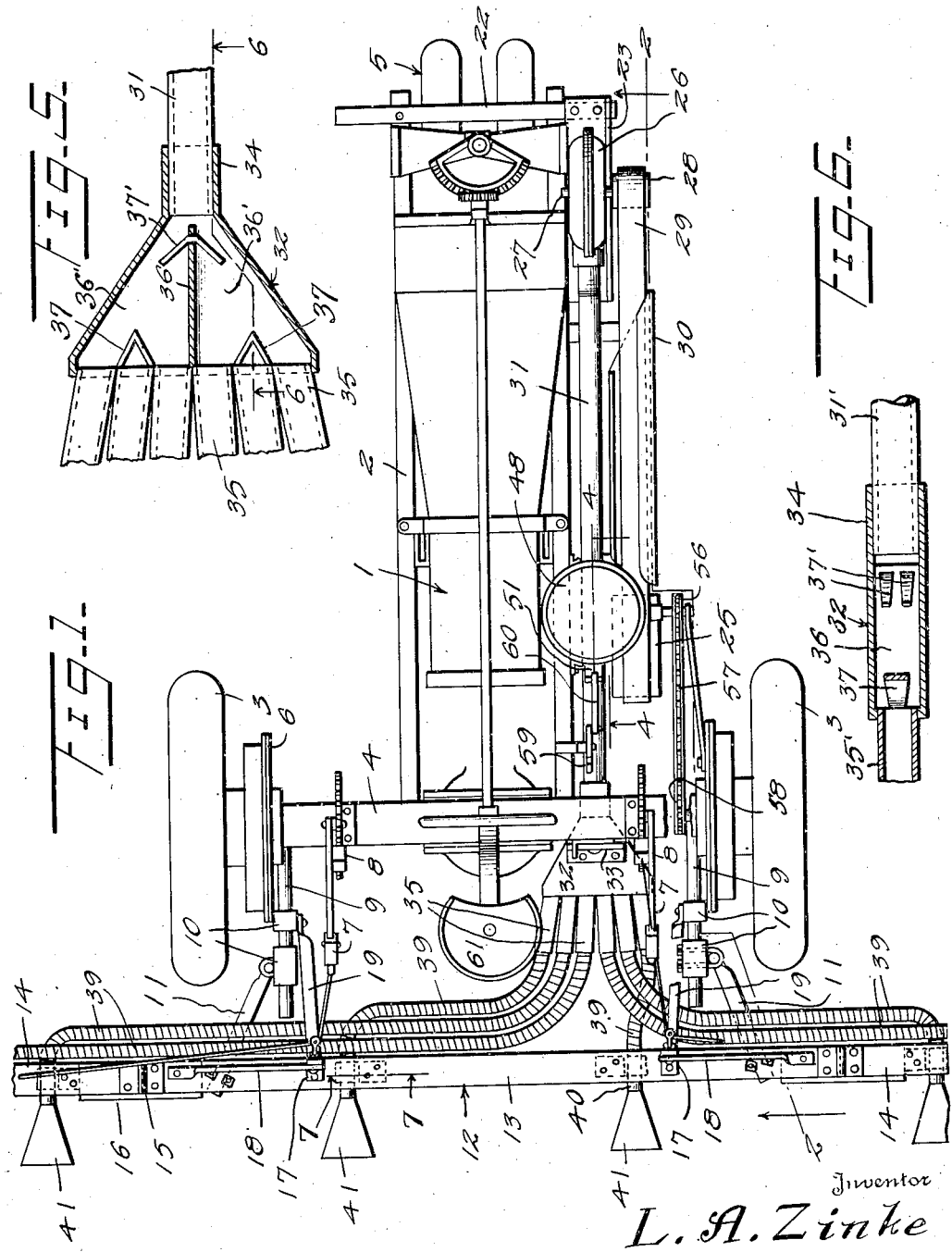

2,171,205

UNITED STATES PATENT OFFICE 2,171,205

POWDER DISTRIBUTING ATTACHMENT FOR TRACTORS

Louis A. Zinke, De Witt County, Tex.

Application August 26, 1937, Serial No. 161,111

2 Claims. (Cl. 43—148)

This invention relates to plant treating apparatus and pertains particularly to an apparatus adapted for the distribution of poison powder over growing plants, particularly cotton plants.

The present invention has for its primary object to provide an improved form of poison powder duster or distributor which may be readily mounted upon any make of farm tractor having a power take-off pulley and means associated with the tractor for supporting farming implements of the nature of cultivators.

Another object of the invention is to provide a poison powder distributor which is so constructed that a large number of plants or rows of plants may be dusted at one time while the carrying vehicle is progressing the length of the rows.

Still another object of the invention is to provide a novel powder distributing mechanism including means for taking in or removing from operation outlying groups of powder discharging nozzles so that the mechanism may be conveniently carried through narrow areas when the device is not in use.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in top plan of the mechanism embodying the present invention and a farm tractor upon which the mechanism is mounted.

Fig. 2 is a longitudinal section taken on the line 2—2 of Fig. 1.

Fig. 3 is a view in rear elevation of the tractor and mechanism, one side of the latter being shown in inoperative position.

Fig. 4 is a sectional view taken on the line 4—4 of Fig. 1.

Fig. 5 is a sectional view taken horizontally through the powder distributing head.

Fig. 6 is a section taken on the line 6—6 of Fig. 5.

Fig. 7 is a section on the line 7—7 of Fig. 1.

Fig. 8 is a section on the line 8—8 of Fig. 2.

Referring now more particularly to the drawings, the numeral 1 generally designates a farm tractor of a standard make in which the power plant is supported upon the chassis 2 which in turn is carried by the rear wheels 3 through the medium of the transverse rear axle housing 4, and the supporting and steering front wheels 5. Tractors of this general construction have the rear axle housing 4 at an elevation above the pivotal centers of the rear supporting wheels 3 and the rear axle housing is coupled with the adjacent wheels through the medium of the relatively flat gear housing 6 which is disposed at the inner side of each rear wheel.

Mounted upon the rear axle housing at each side of the longitudinal center of the machine is a control lever 7 which is held in adjusted position by means of a pawl and ratchet 8 of the usual type. These levers are adapted to be coupled with any one of a number of earth-working units which may be attached to the tractor, and in illustrating the present invention the tractor has been shown without earth-working units attached but with the present poison powder distributing mechanism connected in the position which would ordinarily be occupied by such implements.

For the attachment of earth-working implements to the tractor, the same is provided upon the inner side of each mechanism housing 6 with a rearwardly extending bar 9 which has attached thereto the yokes 10 by means of which rearwardly extending coupling arms 11 are connected to the bars.

The mechanism embodying the present invention comprises the relatively long beam which is generally indicated by the numeral 12 and which is divided into the central portion 13 and the outer portions 14. The outer portions are connected with the ends of the central portion by means of hinges 15 which are placed upon the upper side of the beam so as to permit the outer portions 14 to be swung to the vertical position in which one is illustrated in Fig. 3. In order to maintain the outer portions of the beam 12 in alined relation with the central portion when the apparatus is in use, a rightangle bracket 16 is secured at one end to each end of the central portion 13 to extend therefrom across the adjacent end of the adjacent outer portion when the latter is in down position. This supporting bracket prevents the outer portions from sagging due to the weight of the powder distributing units which are attached thereto.

In order to brace the powder distributing unit supporting beam 12, the central portion 13 is provided with the standard 17 from the upper end of which there extends downwardly and outwardly the brace arm or strut 18 while a similar strut extends downwardly and forwardly as indicated at 19 and is attached to the adjacent bar 9 by means of one of the coupling units 10. The upper end of each standard 17 carries a pulley 20 through which passes a cord 21, one end of which is attached to an outer portion 14 of the beam 12 while the other end is attached to an adjacent one of the control levers 7. Thus by the operation of the levers 7 the outer portions 14 of the nozzle supporting beam may be raised and lowered as desired.

At the front end of the tractor there is secured transversely of the chassis frame 2 the beam 22, and at one side of the tractor there is mounted the plate 23, the forward end of which is disposed upon and secured to the beam 22 while the rear end is suitably supported upon a bracket 24 attached to the adjacent side of the chassis 2. This plate 23 is disposed upon the same side of the tractor as the power take-off pulley 25, and mounted upon the plate 23 is a blower or air fan which is generally designated by the numeral 26 and which carries upon its shaft 27 the pulley wheel 28 which is coupled by means of the belt 29 with the power take-off pulley 25. The lower run of the belt 29 is shielded upon its underside and its outer edge by the shield or guard plate 30 which is suitably attached to the adjacent side of the chassis and which serves to prevent the belt 29 striking and damaging the tops of plants over which the mechanism may pass. The air outlet from the blower 26 is directed rearwardly as shown in Fig. 2, and this has connected to it the air pipe 31 which extends downwardly to the air divider head 32 which is supported by a suitable bracket 33 attached to the rear of the axle housing 4. This air divider is illustrated in detail in Fig. 5, and as shown comprises a substantially triangular housing which at one point merges into the sleeve 34 into which the air pipe 31 extends. The side wall of the housing 32 opposite from the sleeve 34 has connected therewith and extending rearwardly therefrom, the series of collars 35. It is preferred that there be six of these air and powder lead-off collars 35, as it has been found that a machine of this character operates efficiently to distribute poison powder from this number of distributing nozzles.

Within the housing 32 is a partition wall 36 which passes through the housing on a line leading from between the two central collars 35 to the center of the collar 34. This wall terminates short of the inner end of the collar 34 and thus divides the casing into two main chambers 36', the entrances to which are at the rear end of the pipe 31. By providing this partition wall 36, the collars 35 are divided into two groups, each of which opens into the chamber 36' and the central one of each group of collars has connected with its rear or inner end the separated legs of a substantially V-shaped division unit which is indicated by the numeral 37 and which, as shown in Fig. 6, is of a greater width at its apex than at the free ends of its legs. Since the top and bottom edges of this V-shaped unit are spaced from the top and bottom walls of the housing 32, it will be apparent that the air flowing forwardly in the chamber 36' will be divided and will pass over and under the edges of the legs of the unit so that a portion of the air and powder carried thereby will flow into the center one of the three collars 35, and other portions will flow into the two outside collars of the group.

The forward end of the main division wall 36 of the housing 32 is provided upon each side with the rearwardly extending wing members 37' which are obliquely disposed with respect to the wall 36 and which serve to effect a stirring of the powder in the air stream so that the powder will be thoroughly distributed throughout the chamber 36' and each of the outlet collars will receive approximately the same amount.

Each of the sleeves 35 has connected with its outer end one end of a flexible pipe 39 which leads to and is coupled at its other end with the short pipe section 40 which forms a part of a discharge nozzle 41. Each of the pipe sections 40 is suspended from the under side of a section of the beam 12 by means of the bracket structure illustrated in Fig. 7 and generally indicated by the numeral 42. While any suitable supporting structure might be employed at this point, it is preferred that the bracket be made up of a lower pipe engaging portion 43 and an upper angled piece 44 having the depending portion thereof provided with the series of apertures 45 whereby a vertical adjustment of the nozzle may be made through the medium of the bolt 46 which serves the double purpose of securing the lower part 43 of the bracket to the nozzle pipe and securing this lower part 43 to the upper bracket part 44.

Since the central pair of the sleeves 35 which leads from the air and powder divider head 32, will receive the greatest amount of air, it is preferred that these have connected therewith the pipes 39 leading to the outlying distributing nozzles 41. The next longest pipes will be connected with the next of the sleeves lying outwardly of the center ones and the inner nozzles 41 or those nozzles lying nearest the longitudinal center of the machine, will be connected with the sleeves lying at the outer sides of the head 32. By this means each of the nozzles is assured of getting approximately the same amount of powder and air as the others.

Secured to the chassis 2 of the tractor upon the same side as the air pipe 31 and rearwardly from the blower 26, are the two uprights 47 which carry the poison powder receptacle or hopper 48. The bottom wall of the hopper is tapered downwardly and has at its center the outlet collar 50′ into which is slidably extended the upper end of the powder conducting pipe 50. The lower end of this pipe is cut obliquely, as indicated at 50″ and extends through the upstanding sleeve 31′ which forms an integral part of the pipe 31 and which leads to the opening 31″ in this pipe. Through this opening the obliquely cut lower end of the pipe 50 extends and this pipe is so arranged that the longer side will be toward the forward end of the pipe 31 so that the obliquely cut edge 50″ will be directed toward the housing 32. Thus the air flowing through the pipe 31 will strike the back of pipe 50 and as it passes around the obliquely cut edge will create a suction through the pipe to draw the poison powder downwardly from the hopper 48.

The sleeve 31′ has a slot 62 through which extends the screw 63, the inner end of which engages in a suitably threaded aperture in the pipe 50 while the head of the screw engages the outer face of the sleeve 31′ when the screw is drawn up tightly so as to maintain the pipe 50 in an adjusted position. By this means the pipe 50 can be raised or lowered so as to regulate the volume of air which will pass to carry poison powder into the distributing housing 32.

At the upper end of the outlet pipe 50 a slide valve 51 is supported in a suitable guide, to be moved across the end of the pipe 50 and thus regulate the amount of powder which may be drawn from the receptacle. Within the receptacle there is mounted upon the shaft 52 which passes transversely through the receptacle walls, the agitator 53 which is preferably in the form of a wire cylinder or sphere having the arcuate arms 54 which extend lengthwise of the shaft 52 connected by the bars 55 which are preferably arranged in zigzag relation around the agitator frame. Upon the outer end of the shaft 52 a sprocket wheel 56 is mounted and is connected by the sprocket chain 57 with the sprocket wheel 58 which is supported upon an extension of the axle or adjacent rear wheel 3.

Oscillatably mounted upon a suitable support at the rear of the hopper 48 is a lever 59 which is connected by the link 60 with the powder discharge controlling slide 51. This lever 59 is conveniently located with respect to the driver's seat 61 so that the operator of the tractor and of the powder distributing mechanism may be able to conveniently control the amount of powder being discharged from the nozzles 41.

From the foregoing it will be readily apparent that the poison powder distributing mechanism embodying the present invention is of relatively simple construction and may be easily mounted upon any farm tractor which is equipped with a power take-off pulley and means for attaching earth-working implements to the rear thereof.

By providing the novel means illustrated for dividing the flow of air and powder carried thereby, a relatively large group of discharge nozzles may be employed, with the assurance that no one or group of nozzles will receive more powder than another. It is possible to dispose the nozzles at a relatively great distance outwardly from the longitudinal center of the machine and still obtain the proper discharge of poison powder therefrom.

With the convenient means which has been illustrated for supporting the nozzles, it will be seen that even though certain of the nozzles are disposed outwardly a substantial distance from each side of the tractor, they may be swung upwardly and inwardly when the machine is being moved from one field to another so that the outlying portions of the beam will not be broken or damaged or the nozzles damaged, by coming in contact with objects at the side of the road.

What is claimed is:

1. In a poison powder distributor, a wheeled carrier, a plurality of powder distributing nozzles, means for supporting said nozzles in a transversely extending series relative to the carrier and at the rear of the latter, an air and powder distributing casing of substantially triangular form having an inlet opening at an apex of the triangle and directed forwardly with respect to the carrier, a series of outlets for the casing equal in number to the nozzles and arranged in a line perpendicular to the line of flow of material through the inlet, distributing tubes leading from said outlets to said nozzles, means for forcing powder and air under pressure into the casing through the inlet opening, a central division wall in said distributing casing having an end directed toward but spaced from the inlet opening, a plurality of blades extending obliquely from said wall in the direction of the outlets to deflect incoming air and powder to the two sides of the wall, and triangular division units disposed at the sides of said partition wall each in straddling relation to an outlet opening and spaced from the top and bottom of the casing to equalize the distribution of air and powder to the outlet openings immediately adjacent thereto.

2. A powder distributor for the purpose described, comprising a wheeled structure having a power delivering mechanism, a support structure mounted rearwardly of and extending transversely of the wheeled structure, a powder receptacle, a discharge pipe having said receptacle connected therewith, blower means connected with said power means for discharging a blast of air through said pipe, a powder distributor at the rear of the wheeled structure having said pipe discharging thereinto, a plurality of outlet sleeves connected with said distributor, said sleeves being disposed in a horizontal plane and directed rearwardly of the structure, a plurality of distributor nozzles carried by said supporting structure and spaced transversely of the wheeled structure, and a powder conducting pipe connecting each of said sleeves with a distributor nozzle, said last pipes being of different lengths, the shorter ones thereof being connected with those sleeves which are farthest apart and leading to the distributor nozzles which are nearest together and the longer ones of the distributing pipes being connected with the sleeves which are nearest together and leading to the distributor nozzles which are farthest apart.

LOUIS A. ZINKE.